United States Patent
Sugi

(10) Patent No.: US 7,630,704 B2
(45) Date of Patent: Dec. 8, 2009

(54) COMMUNICATION SYSTEM, COMMUNICATION APPARATUS, METHOD AND PROGRAM

(75) Inventor: Junjiro Sugi, Kanagawa (JP)

(73) Assignee: Sony Corporation, Tokyo (JP)

( * ) Notice: Subject to any disclaimer, the term of this patent is extended or adjusted under 35 U.S.C. 154(b) by 67 days.

(21) Appl. No.: 11/039,256

(22) Filed: Jan. 20, 2005

(65) Prior Publication Data

US 2005/0181778 A1 Aug. 18, 2005

(30) Foreign Application Priority Data

Jan. 21, 2004 (JP) ............................. 2004-013507

(51) Int. Cl.
*H04M 1/68* (2006.01)
(52) U.S. Cl. ...................... 455/411; 455/41.2; 455/410; 455/418; 455/419; 455/435.1; 455/522; 380/270
(58) Field of Classification Search ................ 455/41, 455/410, 419
See application file for complete search history.

(56) References Cited

U.S. PATENT DOCUMENTS

| 6,148,205 A * | 11/2000 | Cotton ................. 455/435.1 |
| 7,003,295 B1 * | 2/2006 | Cook et al. ........... 455/435.1 |
| 2002/0016153 A1 * | 2/2002 | Sato et al. ............... 455/41 |
| 2002/0115426 A1 * | 8/2002 | Olson et al. ............ 455/410 |
| 2003/0092395 A1 * | 5/2003 | Gassho et al. .......... 455/68 |
| 2003/0108009 A1 * | 6/2003 | Petersen ................ 370/332 |
| 2004/0076300 A1 * | 4/2004 | Ishidoshiro ............ 380/277 |
| 2004/0147246 A1 * | 7/2004 | Kim ....................... 455/411 |
| 2004/0203592 A1 * | 10/2004 | Kermode et al. ........ 455/411 |

FOREIGN PATENT DOCUMENTS

JP 2001 111628 4/2001

* cited by examiner

*Primary Examiner*—Vincent P Harper
*Assistant Examiner*—Mazda Sabouri
(74) *Attorney, Agent, or Firm*—Frommer Lawrence & Haug LLP; William S. Frommer; Paul A. Levy

(57) ABSTRACT

A communication system including a first and second communication apparatus is provided. The first communication apparatus includes first communication means for communicating with the second communication apparatus using the system information, and first setting means for setting the system information in the first communication means. The second communication apparatus includes second communication means for communicating with the first communication apparatus using the system information, and second setting means for setting the system information in the second communication means. The system information is commonly determined for all of the first and second communication apparatuses. The first and second setting means exchange new system information inputted by a user or given in advance with the second or first communication apparatus after communication is established, and set the new system information in the first or second communication means, respectively.

6 Claims, 5 Drawing Sheets

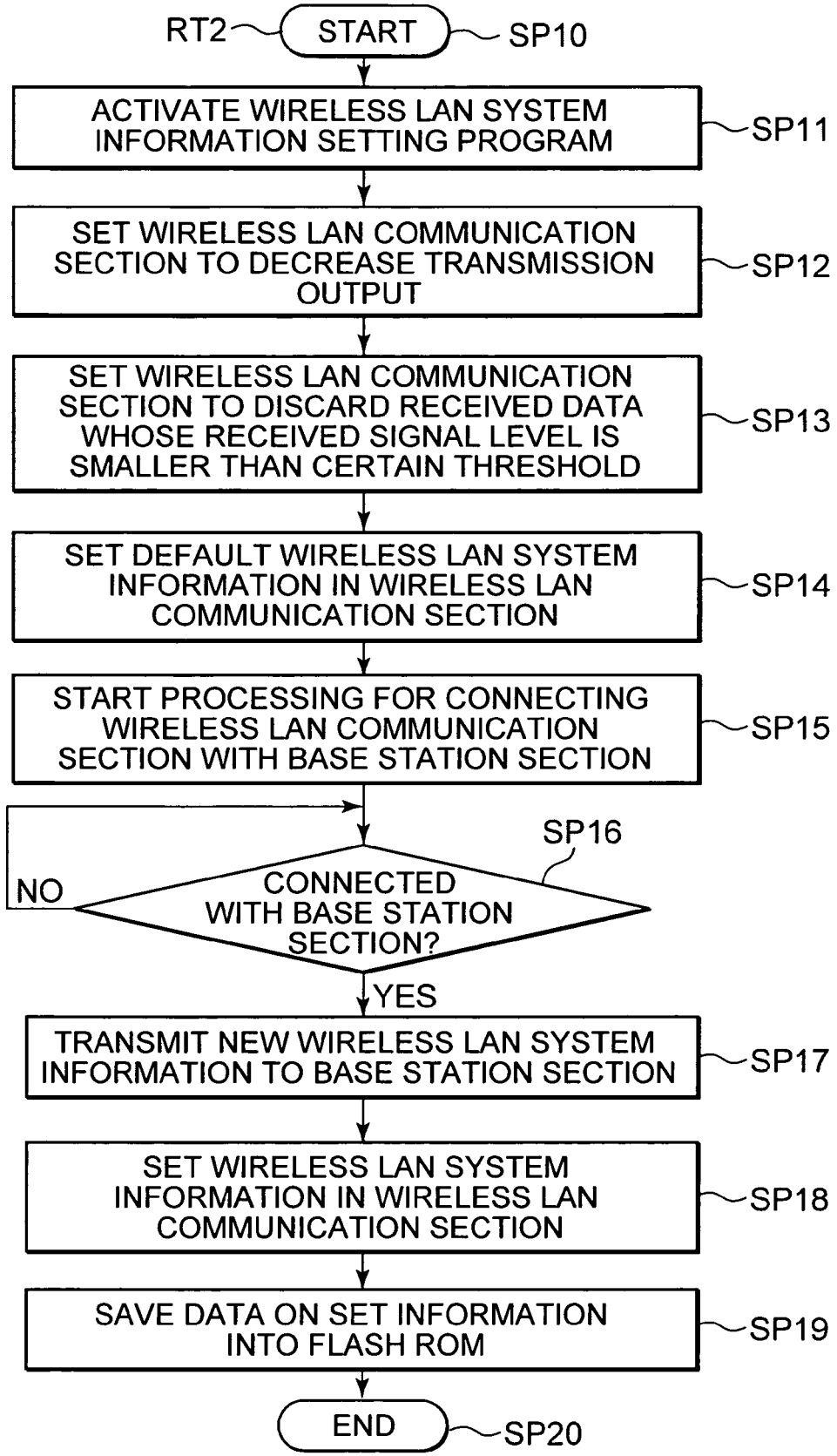

COMMUNICATION SYSTEM, COMMUNICATION APPARATUS, METHOD AND PROGRAM

CROSS REFERENCES TO RELATED APPLICATIONS

The present invention contains subject matter related to Japanese Patent Application JP 2004-013507 filed in the Japanese Patent Office on Jan. 21, 2004, the entire contents of which being incorporated herein by reference.

BACKGROUND OF THE INVENTION

1. Field of the Invention

The present invention relates to a communication system, a communication apparatus and a communication method as well as a program each of which is suitable for application to, for example, a wireless television system.

2. Description of the Related Art

There has recently been proposed a new type of television system in which a body section equipped with a tuner function and the like (hereinafter referred to as the base station section) and a monitor section are separated from each other (for example, see an internet website for "Airboard" (Sony Corporation), http://www.sony.jp/products/consumer/airboard (date of search: Nov. 25, 2003).

In this type of television system (hereinafter referred to as the wireless television system), the base station section and the monitor section are wirelessly connected to each other via a wireless LAN (Local Area Network) conforming to, for example, the IEEE (Institute of Electrical and Electronics Engineers) 802.11 standard, and the monitor section displays a video image while outputting sound, on the basis of video and audio data transmitted from the base station section to the monitor section, whereby a user can enjoy television broadcasts and the like in a wireless manner everywhere in his/her house.

SUMMARY OF THE INVENTION

In a wireless television system of related art, in order that the base station section and the monitor section can establish communication therebetween, these base station section and monitor section need to share wireless LAN system information which includes common network identification information called SSID (Service Set Identification) and information related to encryption (hereinafter referred to as encryption information) such as the presence or absence of encryption, a method for encryption (such as WEP (Wired Equivalent Privacy), and an encryption key.

Accordingly, for example, when the base station section and the monitor section are to be separately purchased to construct the wireless television system, the wireless LAN system information needs to be set in common in the base station section and the monitor section.

However, the base station section is not provided with input means for inputting wireless LAN system information nor display means for displaying inputted wireless LAN system information, so that when wireless LAN system information on the monitor section is to be set in the base station section, the user needs to connect the base station section to his/her personal computer via an interface such as Ethernet (registered trademark) or USB (Universal Serial Bus), and perform setting using the personal computer. Accordingly, there is the drawback such that users having no personal computer cannot perform the setting of wireless LAN system information in their base station sections.

In addition, the wireless television system of related art is constructed so that the setting of wireless LAN system information of the monitor section to the base station section is performed on a monitor screen of the personal computer as mentioned above, while the setting of wireless LAN system information of the base station section to the monitor section is performed with a predetermined GUI screen displayed on a display of the monitor section. However, at the time of setting, the user occasionally erroneously sets the wireless LAN system information, so that the there is a case where the base station section and the monitor section fail to be wirelessly connected.

The present invention has been made in view of the above-mentioned drawbacks. It is desirable to provide a communication system, a communication apparatus and a communication method as well as a program, each of which makes it possible to improve user-friendliness by facilitating the setting of system information.

According to an embodiment of the present invention, there is provided a communication system including a first communication apparatus and a second communication apparatus. In the communication system, the first communication apparatus includes first communication means for performing communication with the second communication apparatus in accordance with a predetermined wireless communication standard by using preset system information, and first setting means for setting the system information in the first communication means. The second communication apparatus includes second communication means for performing communication with the first communication apparatus in accordance with the predetermined wireless communication standard by using the preset system information, and second setting means for setting the system information in the second communication means. The first and second setting means set the system information in a corresponding one of either the first or second communication means, the system information being commonly predetermined for all of the first and second communication apparatuses. Further, the first and second setting means exchange new system information inputted by a user or given in advance with a counterpart of either the second or first communication apparatus after communication is established between the first and second communication means, and set the new system information in the first or second communication means, respectively.

Accordingly, in the communication system, when the system information is to be set in each of the first and second communication apparatuses, it is possible to prevent the occurrence of the drawback such that the first and second communication apparatuses fail to be wirelessly connected, due to an inputting error of the system information.

Furthermore, according to an embodiment of the present invention, there is provided a communication apparatus including communication means for performing communication with another communication apparatus in accordance with a predetermined wireless communication standard by using preset system information, and setting means for setting the system information in the communication means. The setting means sets the preset system information commonly predetermined for own communication apparatus and all of other communication apparatuses. Furthermore, the setting means exchanges new system information inputted by a user or given in advance with another communication apparatus after communication is established, and sets the new system information in the corresponding communication means.

Accordingly, in the present communication apparatus, when the system information is to be set, it is possible to prevent the occurrence of the drawback such that the communication apparatus and the another communication apparatus fail to be wirelessly connected, due to an inputting error of the system information.

According to another embodiment of the present invention, there is provided a communication method. The communication method includes: a first step of setting preset system information commonly predetermined for own communication apparatus and all of the other communication apparatuses in communication means for performing communication with another communication apparatus in accordance with a predetermined wireless communication standard by using the system information; and a second step of, after communication with the another communication apparatus is established, exchanging new system information inputted by a user or given in advance with the another communication apparatus, and setting the new system information in the corresponding communication means.

Accordingly, according to the present communication method, when the system information is to be set, it is possible to prevent the occurrence of the drawback that the corresponding communication apparatus and the another communication apparatus fail to be wirelessly connected, due to an inputting error of the system information.

Furthermore, according to another embodiment of the present invention, there is provided a program for a computer which controls a communication apparatus capable of performing communication with another communication apparatus in accordance with a predetermined wireless communication standard by setting preset system information in common to the another communication apparatus. The program causes the computer to execute processing including: a first step of setting preset system information commonly predetermined for the own communication apparatus and all of the other communication apparatuses in communication means for performing communication with another communication apparatus in accordance with a predetermined wireless communication standard by using preset system information; and a second step of, after communication with the another communication apparatus is established, exchanging new system information inputted by a user or given in advance with the another communication apparatus and setting the new system information in the corresponding communication means.

Accordingly, according to the present program, when the system information is to be set, it is possible to prevent the occurrence of the drawback that the corresponding communication apparatus and the another communication apparatus fail to be wirelessly connected, due to an inputting error of the system information.

Furthermore, according to the embodiments of present invention, it is possible to realize a wireless television system, a communication apparatus, a communication method and a program, which are improved in user-friendliness in their operation.

BRIEF DESCRIPTION OF THE DRAWINGS

The above and other objects, features and advantages of the present invention will become more apparent from the following description of the presently exemplary embodiment of the invention taken in conjunction with the accompanying drawings, in which:

FIG. 6 is a flowchart showing a second wireless LAN system information setting processing sequence.

DETAILED DESCRIPTION OF THE EMBODIMENTS

Embodiments of the present invention will be described below with reference to the accompanying drawing.

(1) Construction of Wireless Television System According to an Embodiment

Figure 1:
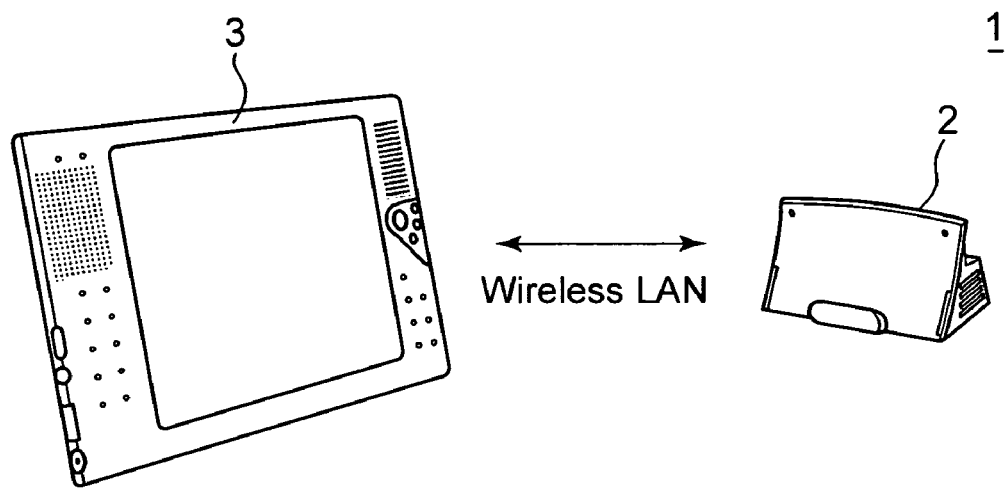
FIG. 1 is a schematic view showing the entire construction of a wireless television system according to an embodiment of the present invention.

In FIG. 1, reference numeral 1 denotes the entire part of a wireless television system according to the present embodiment, and includes a base station section 2 equipped with a tuner function and the like, and a monitor section 3 for displaying a video image and outputting sound both of which are based on video and audio data transmitted from this base station section 2.

Figure 2:
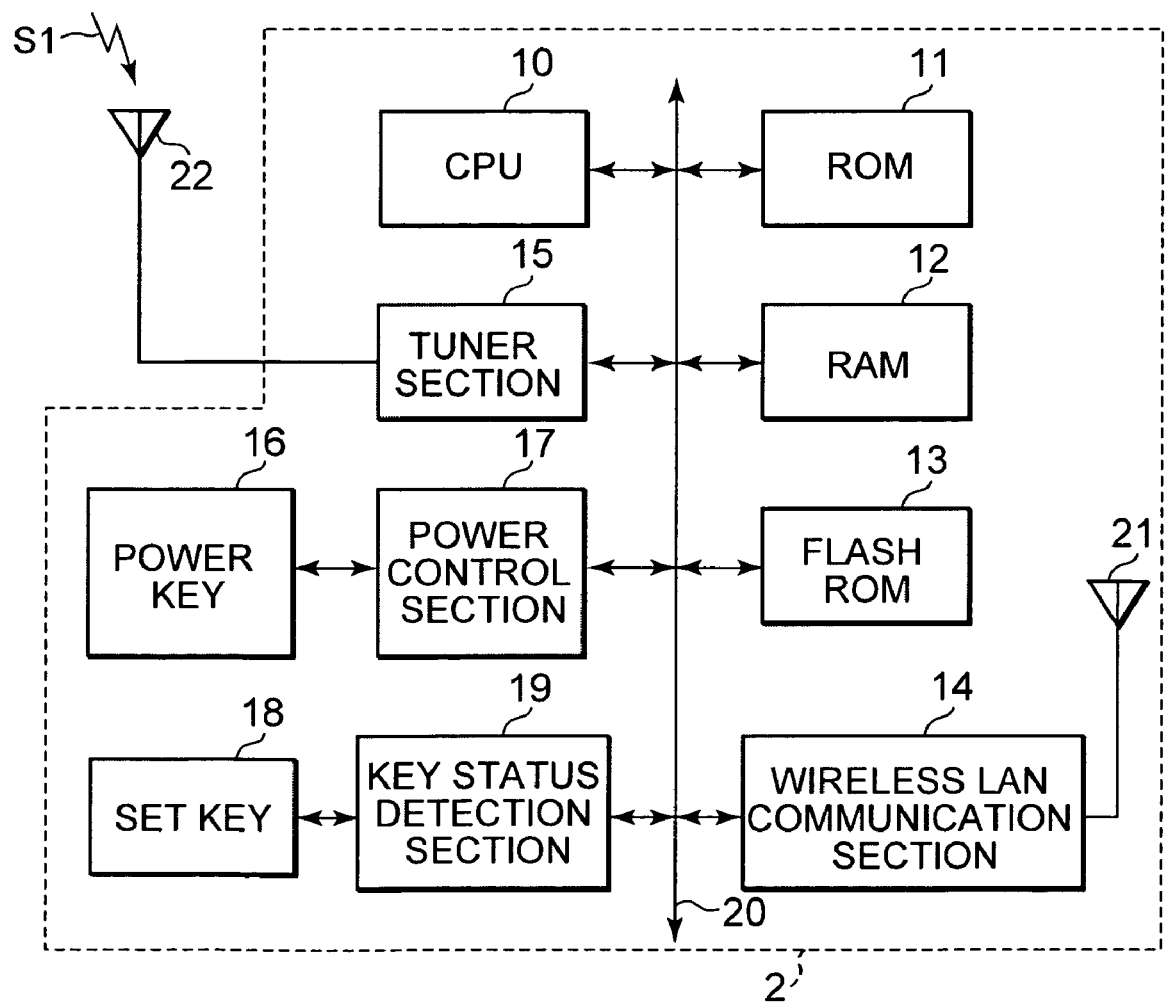
FIG. 2 is a block diagram showing the construction of a base station section.

As shown in FIG. 2, the base station section 2 includes a CPU (Central Processing Unit) 10, a ROM (Read Only Memory) 11 which stores and saves various kinds of control programs and the like, a RAM (Random Access Memory) 12 serving as a work memory for the CPU 10, a flash ROM 13 which stores predetermined wireless LAN system information, a wireless LAN communication section 14 which conforms to the IEEE 802.11 standard, a tuner section 15 for receiving television broadcasts, a power source control section 16 which controls power on/off of the entire base station section 2, and a key status detection section 19 which detects the state of a set key 18 disposed at a predetermined position of the body of the base station section 2, and these sections are interconnected via a bus 20.

In this case, the power source control section 17 constantly monitors whether a power source key 16 disposed at a predetermined position of the body is depressed, and if the power source key 16 is depressed, the power source control section 17 controls a power source circuit (not shown in the figure) to start or stop supply of driving currents to individual circuits, thereby switching on or off the power source of the base station section 2.

The key status detection section 19 constantly monitors the state of the set key 18, and when the set key 18 is depressed, the key status detection section 19 notifies the CPU 10 of this fact. At this time, the CPU 10 reads a wireless LAN system information setting program stored and saved in the ROM 11, and sets wireless LAN system information in the wireless LAN communication section 14 in accordance with this wireless LAN system information setting program as will be described later.

Thus, the wireless LAN communication section 14 is adapted to subsequently perform communication with the monitor section 3 by using the wireless LAN system information which has been set in this manner, and if the wireless LAN communication section 14 receives via an antenna 21, for example, various control commands and various data transmitted from the monitor section 3, the wireless LAN communication section 14 transmits these control commands and data to the CPU 10 via the bus 20.

At this time, the CPU 10 executes various kinds of control processing on the basis of the various control commands and the various data transmitted from the monitor section 3 and given to the CPU 10 from the wireless LAN communication section 14, as well as various programs stored in the ROM 11, and if, for example, a command to request transfer of video and audio data on a certain channel is given from the monitor section 3 in response to a user operation, the CPU 10 notifies the tuner section 15 of this fact.

Thus, at this time, the tuner section 15 receives a television broadcast signal S1 on a specified channel from among television broadcast signals on individual channels which are received via an external antenna 22, and performs predetermined signal processing such as detection on this television broadcast signal S1, and sequentially transmits the thus-obtained video and audio data on the channel to the wireless LAN communication section 14. Thus, after that, this video and audio data is transmitted to the monitor section 3 by the wireless LAN communication section 14.

Figure 3:
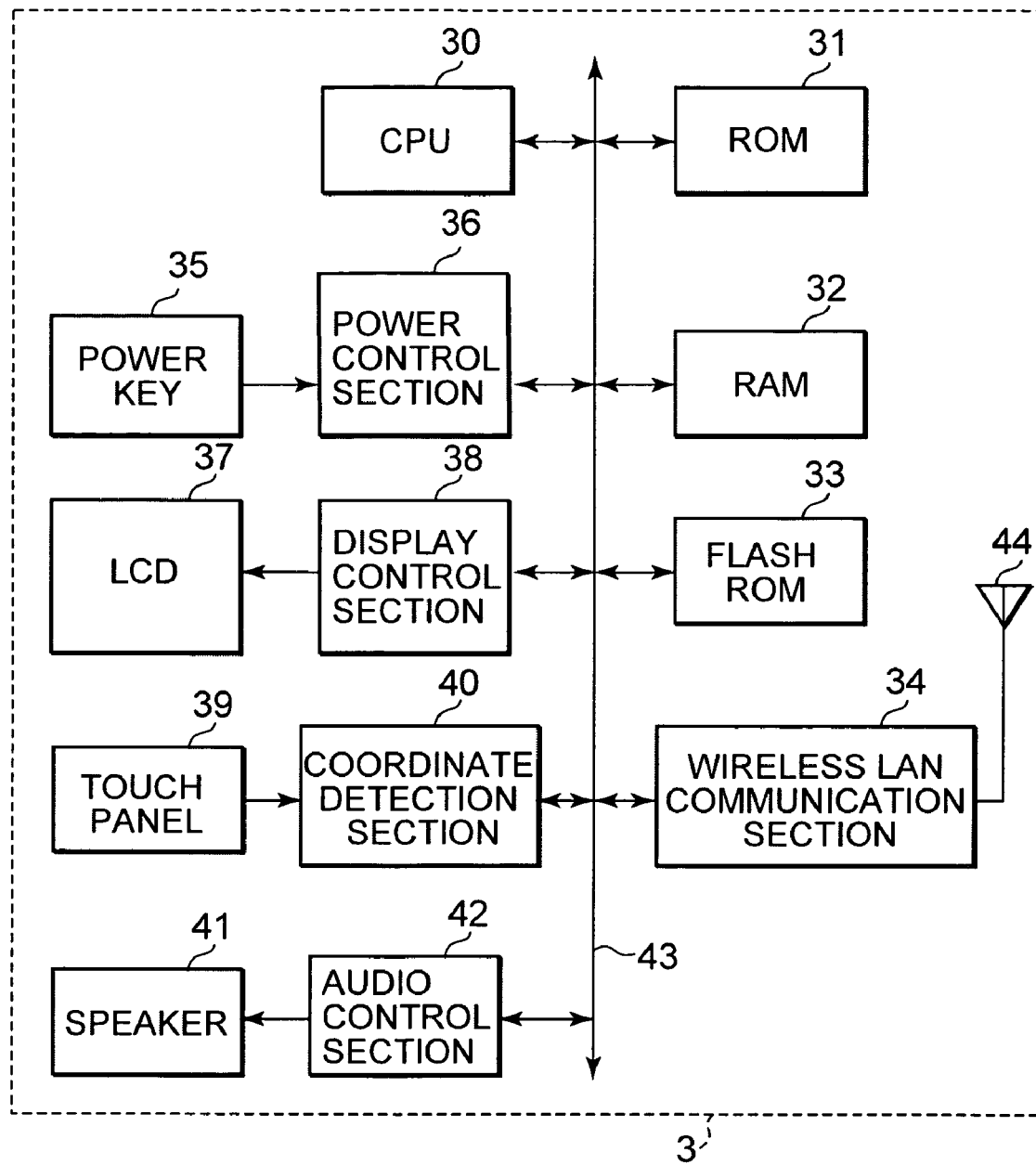
FIG. 3 is a block diagram showing the construction of a monitor section.

As shown in FIG. 3, the monitor section 3 includes a CPU 30, a ROM 31 which stores and saves various kinds of control programs and the like, a RAM 32 serving as a work memory for the CPU 30, a flash ROM 33 which stores predetermined wireless LAN system information on this monitor section 3, a wireless LAN communication section 34 which conforms to the IEEE 802.11 standard, a power source control section 36 which controls power on/off of the entire monitor section 3, a display control section 38 which controls an LCD (Liquid Crystal Display) 37, a coordinate detection section 40 which detects a coordinate position operated by the user, on a touch panel 39 disposed on a front section of the LCD 37, and an audio control section 42 which controls sound to be outputted via a speaker 41, and all of these sections are interconnected via a bus 43.

In this case, the power source control section 36 constantly monitors whether a power source key 35 disposed at a predetermined position of the body of the monitor section 3 is depressed, and if the power source key 35 is depressed, the power source control section 36 controls a power source circuit (not shown in the figure) to start or stop supply of driving currents to individual circuits, thereby switching on or off the power source of the monitor section 3.

In addition, during an initial period when wireless LAN system information on the base station section 2 is not set in the wireless LAN communication section 34, the CPU 30 causes the LCD 37 to display, for example, a predetermined GUI (Graphical User Interface) screen for setting wireless LAN system information, by giving the display control section 38 image data based on the various kinds of control programs, in response to a user operation.

Next, when the CPU 30 in this state recognizes that there is an input indicating an instruction to set wireless LAN system information, on the basis of a detection result by the coordinate detection section 40, the CPU 30 reads a wireless LAN system information setting program stored in the ROM 31, and sets wireless LAN system information in the wireless LAN communication section 14 in accordance with this wireless LAN system information setting program as will be described later.

Thus, the wireless LAN communication section 34 is adapted to subsequently perform communication with the base station section 2 by using the wireless LAN system information which has been set in this manner, and if the wireless LAN communication section 34 receives via an antenna 44, for example, various control commands transmitted from the base station section 2, the wireless LAN communication section 34 transmits these control commands to the CPU 30 via the bus 43.

At this time, the CPU 30 executes various kinds of control processing on the basis of the various control commands transmitted from the base station section 2 and given to the CPU 30 from the wireless LAN communication section 34, as well as various programs stored in the ROM 31. Accordingly, for example, from video and audio data received from the base station section 2 by the wireless LAN communication section 34, the video data is given to the display control section 38 and a video image based on the video data is displayed on the LCD 37, while the audio data from the video and audio data is given to the audio control section 42 and sound based on the audio data is outputted from the speaker 41.

In this manner, this wireless television system 1 permits the user to view at the monitor section 3 a video image with sound based on the video and audio data transmitted from the base station section 2.

Figure 4:
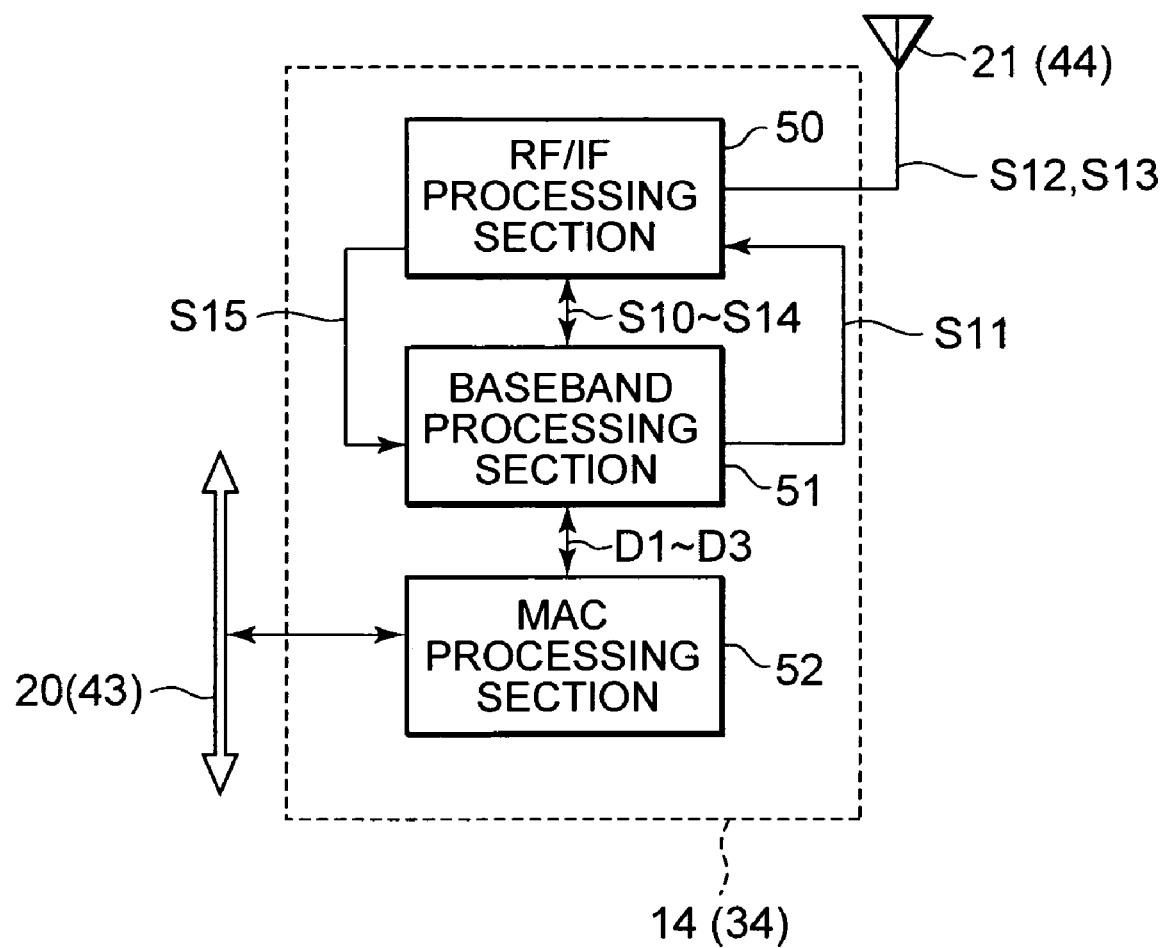
FIG. 4 is a block diagram showing the construction of a wireless LAN communication section.

FIG. 4 shows a specific construction of each of the wireless LAN communication sections 14 and 34 in the base station section 2 and the monitor section 3.

As is apparent from FIG. 4, each of the wireless LAN communication sections 14 and 34 includes an RF (Radio Frequency)/IF (Intermediate Frequency) processing section 50, a baseband processing section 51, and a MAC (Media Access Control) processing section 52.

In this case, the MAC processing section 52 performs predetermined MAC processing, such as encryption based on encryption information contained in wireless LAN system information, conversion to a frame format conforming to the IEEE 802.11 standard, and control of transmission timing, on various data such as video and audio data given via the bus 20 or 43, and transmits obtained frame data D1 to the baseband processing section 51.

The baseband processing section 51 modulates the supplied frame data D1 into an IQ signal S10, and transmits this IQ signal S10 to the RF/IF processing section 50. In addition, the baseband processing section 51 simultaneously transmits to the RF/IF processing section 50 a transmission output control signal S11 corresponding to a set value of a transmission output level which is set in the MAC processing section 52, and sets the gain of an amplifier (not shown) included in the RF/IF processing section 50 to a value corresponding to the set value.

The RF/IF processing section 50 converts the IQ signal S10 given from the baseband processing section 51 into an intermediate frequency (IF) signal, and further up-converts this IF signal to a high frequency (RF) signal. After that, the RF/IF processing section 50 amplifies this RF signal S12 through the amplifier, and transmits the amplified RF signal S12 via the antenna 21 or 44 to the monitor section 3 or the base station section 2 which is the other communication section.

On the other hand, the RF/IF processing section 50 down-converts a high frequency signal S13 transmitted from the monitor section 3 or the base station section 2 which is the other communication section, and received via the antenna 21 or 44, into an intermediate frequency signal, and further converts this intermediate frequency signal to an IQ signal S14 and transmits the IQ signal S14 to the baseband processing section 51. In addition, the RF/IF processing section 50 transmits a detection result obtained in its internal detection circuit (not shown) to the baseband processing section 51 as a detected signal S15.

The baseband processing section 51 demodulates the IQ signal S14 given from the RF/IF processing section 50 into frame data D2 and transmits the obtained frame data D2 to the MAC processing section 52. At this time, the baseband processing section 51 also detects an RSSI (Received Signal Strength Indicator) value indicative of the strength of the received signal (i.e., the received high frequency signal) on the basis of the detected signal S15 given from the RF/IF processing section 50, and transmits the detection result to the MAC processing section 52 as RSSI value information D3.

The MAC processing section 52 decrypts the frame data D2 given from the baseband processing section 51 in accordance with the encryption information contained in the wireless LAN system information, and extracts necessary data such as video and audio data and transmits this extracted data to corresponding blocks such as the CPU 10 or 30 and the display control section 38 via the bus 20 or 43. On the other hand, at this time, if the RSSI value of the received signal recognized on the basis of the RSSI value information D3 is smaller than a predetermined value which is set in advance by a CPU 10 or 30 as will be described later, the MAC processing section 52 discards the frame data D2.

In this manner, the wireless LAN communication sections 14 and 34 are capable of performing communication with each other in conformity with the IEEE 802.11 standard while discarding frame data whose signal level is low, as occasion demands.

(2) Wireless LAN System Information Setting Processing

Setting processing for wireless LAN system information in each of the base station section 2 and the monitor section 3 of this wireless television system 1 will be described below.

In this wireless television system 1, the base station section 2 and the monitor section 3 are respectively equipped with wireless LAN system information setting functions which, when the set key 18 (FIG. 2) of the base station section 2 is depressed and the touch panel 39 is operated with the predetermined GUI displayed on the LCD 37 (FIG. 3), perform communication between the base station section 2 and the monitor section 3, automatically share wireless LAN system information, and set this wireless LAN system information in the respective wireless LAN communication sections 14 and 34.

Figure 5:
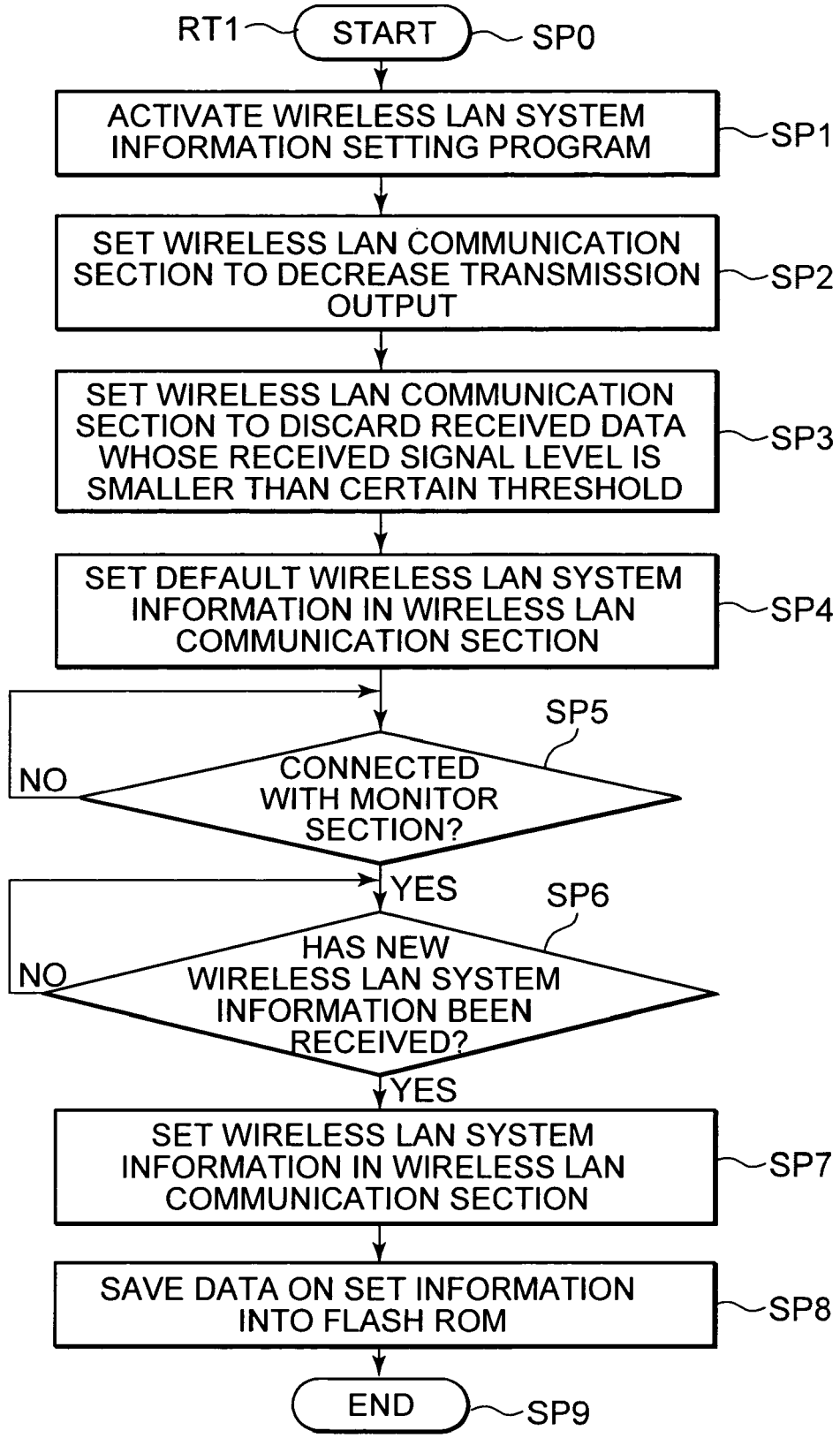
FIG. 5 is a flowchart showing a first wireless LAN system information setting processing sequence.

In this case, various kinds of processing related to the wireless LAN system information setting function in the base station section 2 (hereinafter referred to as the wireless LAN system information setting processing) is performed in accordance with a first wireless LAN system information setting processing sequence RT1 shown in FIG. 5, on the basis of the wireless LAN system information setting program stored in the ROM 11.

In practical operation, when the CPU 10 of the base station section 2 recognizes through notice from the key status detection section 19 that the set key 18 is depressed, the CPU 10 starts this first wireless LAN system information setting processing sequence RT1 in step SP0, and in the next step SP1, reads the wireless LAN system information setting program from the ROM 11 and loads this program into the RAM 12.

Next, the CPU 10 proceeds to step SP2 and sets a predetermined value in the MAC processing section 52 of the wireless LAN communication section 14 to decrease the output level of a transmitted signal to a predetermined minimum level. This is because if the transmission output of the base station section 2 is high during the setting of wireless LAN system information, there is a risk that communication which is being performed between the base station section 2 and the monitor section 3 during this time is intercepted by a malicious third party and wireless LAN system information to be subsequently exchanged between the base station section 2 and the monitor section 3 is stolen, so that communication between the base station section 2 and the monitor section 3 after the setting of the wireless LAN system information may be intercepted or illegally accessed.

For this reason, in this wireless television system 1, when the wireless LAN system information is to be set in the base station section 2 and the monitor section 3, the transmission outputs of the base station section 2 and the monitor section 3 are reduced to restrict a distance to be reached by radio waves transmitted from these sections 2 and 3, on the assumption that these base station section 2 and monitor section 3 are positioned at an extremely close distance from each other. In addition, at this time, each of the base station section 2 and the monitor section 3 receives only data acceptable as being transmitted from a close distance and discards any other data, thereby improving safety during the setting of the wireless LAN system information.

Accordingly, in the subsequent step SP3, the CPU 10 sets the wireless LAN communication section 14 to discard received data whose received signal has a signal level smaller than a certain threshold. Specifically, the CPU 10 sets a predetermined value which is determined in advance as the minimum value of the RSSI values of received signals to be constantly detected by the wireless LAN communication section 14, in the MAC processing section 52 of the wireless LAN communication section 14. In consequence, subsequently, the wireless LAN communication section 14 constantly monitors the RSSI value of each received signal, and receives only data whose RSSI value is not smaller than the value set by the CPU 10 and discards any other data (data whose RSSI value is smaller than the value set by the CPU 10).

Next, the CPU 10 proceeds to step SP4 and sets default wireless LAN system information in the wireless LAN communication section 14. At this time, the CPU 10 sets the wireless LAN system information common to all base station sections 2 and all monitor sections 3 determined in advance by the wireless LAN system information setting program, in the MAC processing section 52 of the wireless LAN communication section 14. In this case, for example, a communication method using a clear text with no encryption or a common key method using an encryption key can be applied as a default value of encryption information. Thus, subsequently, the wireless LAN communication section 14 sequentially executes authentication processing (authentication) for the monitor section 3 and connection processing (association) for connection with the monitor section 3 in accordance with a sequence provided in the IEEE 802.11 standard by using that wireless LAN system information.

During this time, the CPU 10 proceeds to step SP5 and waits for communication to be established between the base station section 2 and the monitor section 3. Next, when the CPU 10 recognizes through notice from the wireless LAN communication section 14 that the base station section 2 is wirelessly connected with the monitor section 3, the CPU 10 proceeds to step SP6 and waits for new wireless LAN system information to be transmitted from the monitor section 3 as will be described later (step SP17 of FIG. 6).

Subsequently, when the CPU 10 receives new wireless LAN system information from the monitor section 3, the CPU 10 sets this new wireless LAN system information in the MAC processing section 52 of the wireless LAN communication section 14 (step SP7). Thus, subsequently, the wireless LAN communication section 14 performs communication with the monitor section 3 by using this newly set wireless LAN system information.

Next, the CPU 10 proceeds to step SP8 and saves this new wireless LAN system information into the flash ROM 13. Thus, even if the power source of the base station section 2 is subsequently turned off, at the next time that the power source is turned on, the CPU10 reads this wireless LAN system information from the flash ROM 13 and sets the read wireless LAN system information in the wireless LAN communication section 14, thereby establishing communication with the monitor section 3 by using this wireless LAN system information. Furthermore, the CPU 10 proceeds to step SP9 and ends this first wireless LAN system information setting processing sequence RT1.

In this manner, the CPU 10 of the base station section 2 sets the wireless LAN system information necessary for communication with the monitor section 3 in the wireless LAN communication section 14 on the basis of the wireless LAN system information setting program.

Wireless LAN system information setting processing in the monitor section 3 is performed on the basis of the wireless LAN system information setting program stored in the ROM 31 (FIG. 3), in accordance with the second wireless LAN system information setting processing sequence RT2 shown in FIG. 6.

In practical operation, when the CPU 30 of the monitor section 3 recognizes through notice from the coordinate detection section 40 that there is an input indicating an instruction to set wireless LAN system information, with the predetermined GUI screen for setting wireless LAN system information displayed on the LCD 37, the CPU 30 starts this second wireless LAN system information setting processing sequence RT2 in step SP10, and in the next step SP11, reads the wireless LAN system information setting program from the ROM 31 and loads this program into the RAM 12.

Next, the CPU 30 proceeds to step SP12 and sets a predetermined value in the MAC processing section 52 of the wireless LAN communication section 34 to decrease the output level of a transmitted signal to a predetermined minimum level. Subsequently, the CPU 30 proceeds to step SP13 and sets a predetermined value which is determined in advance as the minimum value of the RSSI values, in the MAC processing section 52 of the wireless LAN communication section 34. In consequence, subsequently, the wireless LAN communication section 34 constantly monitors the RSSI value of each received signal, and receives only data whose RSSI value is not smaller than the value set by the CPU 30 and discards any other data (data whose RSSI value is smaller than the value set by the CPU 30).

Next, the CPU 30 proceeds to step SP14 and sets default wireless LAN system information in the wireless LAN communication section 34. At this time, the CPU30 sets the wireless LAN system information commonly predetermined for all base station sections 2 and all monitor sections 3 by the wireless LAN system information setting program, in the wireless LAN communication section 34.

Next, the CPU30 proceeds to step SP15 and starts processing for establishing communication between the monitor section 3 and the base station section 2, and sequentially executes detection processing (scanning) for the base station section 2, authentication processing (authentication) for the base station section 2, and connection processing (association) for connection with the base station section 2 in accordance with a sequence provided in the IEEE 802.11 standard.

During this time, the CPU 30 proceeds to step SP16 and waits for communication to be established between the monitor section 3 and the base station section 2. Next, when the CPU 30 recognizes through notice from the wireless LAN communication section 34 that the monitor section 3 is wirelessly connected with the base station section 2, the CPU 30 transmits new wireless LAN system information inputted by the user via the touch panel 39 to base station section 2.

Next, the CPU 30 proceeds to step SP18 and sets this new wireless LAN system information in the MAC processing section 52 of the wireless LAN communication section 34, and in the next step SP19, saves this new wireless LAN system information into the flash ROM 33. Thus, even if the power source of the monitor section 3 is subsequently turned off, at the next time that the power source is turned on, the CPU 30 reads this wireless LAN system information from the flash ROM 33 and sets the read wireless LAN system information in the wireless LAN communication section 34, thereby establishing communication with the base station section 2 by using this wireless LAN system information. Furthermore, the CPU 30 proceeds to step SP20 and ends this second wireless LAN system information setting processing sequence RT2.

In this manner, the CPU 30 of the monitor section 3 sets the wireless LAN system information necessary for communication with the base station section 2 in the wireless LAN communication section 34 on the basis of the wireless LAN system information setting program.

(3) Operation and Advantage of the Present Embodiment

According to the above-mentioned construction, in this wireless television system 1, when wireless LAN system information on one communication section, which is for the monitor section 3 or the base station section 2, is to be set in the other of the base station section 2 and the monitor section 3, the base station section 2 and the monitor section 3 first establish communication with each other by using the wireless LAN system information commonly predetermined for all of the base station sections 2 and monitor sections 3 by the wireless LAN system information setting program, and subsequently exchange and share therebetween new wireless LAN system information inputted to the monitor section 3 by the user and set this new wireless LAN system information in the respective wireless LAN communication sections 14 and 34.

Accordingly, in this wireless television system 1, when wireless LAN system information is to be set in the base station section 2 and the monitor section 3, there is no need for any other device such as a personal computer, and it is also possible to reliably prevent the occurrence of the drawback that communication fails to be established between the base station section 2 and the monitor section 3 due to an inputting error during the setting of the wireless LAN system information.

In addition, in this wireless television system 1, when the wireless LAN system information is to be set in the base station section 2 and the monitor section 3 in this manner, in each of the base station section 2 and the monitor section 3, the output level of the transmitted signal of each of the respective wireless LAN communication sections 14 and 34 is decreased and received data whose received signal has a signal level smaller than a threshold is discarded. Accordingly, it is possible to minimize the risk that the wireless LAN system information of the base station section 2 and the monitor section 3 is stolen and the communication between the base station section 2 and the monitor section 3 is intercepted or illegally accessed, whereby it is possible to ensure high safety.

According to the above-mentioned construction, when wireless LAN system information is to be set in the base station section 2 and the monitor section 3, the base station section 2 and the monitor section 3 establish communication with each other by using wireless LAN system information commonly predetermined for all of the base station sections 2 and monitor sections 3 by the wireless LAN system information setting program, and subsequently exchange therebetween new wireless LAN system information and set this new wireless LAN system information in the respective wireless LAN communication sections 14 and 34. Accordingly, it is possible to prevent the occurrence of the drawback that communication fails to be established between the base station section 2 and the monitor section 3 due to an inputting error during the setting of the wireless LAN system information in the base station section 2 and the monitor section 3, whereby it is possible to realize a wireless television system improved in user-friendliness.

(4) Other Embodiments

In the above description of the embodiment, reference has been made to the case where the present invention is applied to the wireless television system 1. However, the present invention is not limited to this case and can be widely applied to various communication systems other than the wireless television system 1.

In the above description of the embodiment, reference has been made to the case where each of the wireless LAN communication sections 14 and 34, which serves as communication means for performing communication with the opposite one of the monitor section 3 and the base station section 2 by using the set wireless LAN system information, conforms to the IEEE 802.11 standard. However, the present invention is not limited to this case, and may also be applied to communication means conforming to other wireless communication standards.

Furthermore, in the above description of the embodiment, reference has been made to the case where the CPUs 10 and 30, which respectively serve as setting means for setting wireless LAN system information in the wireless LAN communication sections 14 and 34 in the base station section 2 and the monitor section 3, set new wireless LAN system information inputted by the user in the wireless LAN communication sections 14 and 34. However, the present invention is not limited to this case, and may also be applied to an example in which the new wireless LAN system information is held in advance in the flash ROM 13 of the base station section 2 or the flash ROM 33 of the monitor section 3, and after communication is established between the base station section 2 and the monitor section 3 by using wireless LAN system information commonly determined for all of the base station sections 2 and monitor sections 3, unique wireless LAN system information which is held in the flash ROM 13 of the base station section 2 or the flash ROM 33 of the monitor section 3 is exchanged between the base station section 2 and the monitor section 3 and this wireless LAN system information is set in the wireless LAN communication sections 14 and 34.

The present invention can be widely applied not only to wireless television systems, but also to various other wireless communication systems as well as communication apparatuses which constitute these systems.

It should be understood by those skilled in the art that various modifications, combinations, sub-combinations and alternations may occur depending on design requirements and other factors insofar as they are within the scope of the appended claims or the equivalents thereof.

What is claimed is:

1. A communication method of performing communication between a first communication apparatus and a second communication apparatus in accordance with a wireless communication standard, comprising:

a first step of detecting by the first communication apparatus a user request for a new system information;

a second step of decreasing an output level of the first communication apparatus of a transmitted signal to a first predetermined level;

subsequently, discarding by the first communication apparatus any signal received by the first communication apparatus that is less than a second predetermined value;

a third step of setting the first communication apparatus to communicate by a default wireless communication standard;

a fourth step of authenticating the second communication apparatus to the first communication apparatus;

a fifth step of receiving by the second communication apparatus the user request for new system information;

and sixth step of decreasing, in response to receiving the user request for new system information, an output level of the second communication apparatus of a transmitted signal to a third predetermined level;

subsequently discarding by the second communication apparatus any signal received by the second communication apparatus that is less than a fourth predetermined value;

a seventh step of setting the second communication apparatus to communicate by the default wireless communication standard;

an eighth step of authenticating the first communication apparatus to the second communication apparatus;

a ninth step of establishing communication between the second communication apparatus and the first communication apparatus using the default wireless communication standard;

a tenth step of transmitting the new system information from the second communication apparatus to the first communication apparatus; and a eleventh step of establishing communication between the second communication apparatus and the first communication apparatus using the new system information, wherein the first step to the fourth step are performed in the recited order, and wherein the fifth step to the eleventh step are performed in the recited order.

2. The communication method according to claim 1, wherein the system information includes common network identification information and information related to encryption.

3. The communication method of claim 1, wherein the first predetermined value and the third predetermined values are equal, and wherein the second predetermined value and the fourth predetermined value are equal.

4. A communication system adapted to allow communication between a first communication apparatus and a second communication apparatus in accordance with a wireless communication standard, comprising:

a detecting device configured to detect by the first communication apparatus a user request for a new system information;

a first decreasing device configured to decrease an output level of the first communication apparatus of a transmitted signal to a first predetermined level after detection of the user request;

a discarding device configured to discard by the first communication apparatus any signal received by the first communication apparatus that is less than a second predetermined value subsequent to a decrease in the output level of the first communication device;

a setting device configured to set the first communication apparatus to communicate by a default wireless communication standard after decreasing the output of the first communication apparatus;

an authenticating device configured to authenticate the second communication apparatus to the first communication apparatus after setting the first communication apparatus to the default wireless standard;

a first transmitting device configured to transmit from the first communication apparatus at the decreased output with the default communication standard after the second communication apparatus is authenticated to the first communication apparatus;

a receiving device configured to receive by the second communication apparatus the user request for new system information;

a second decreasing device configured to decrease an output level of the second communication apparatus of a transmitted signal to a third predetermined level after receiving the user request for new system information;

a discarding device configured to subsequently discard by the second communication apparatus any signal received by the second communication apparatus that is less than a fourth predetermined value;

a setting device configured to set the second communication apparatus to communicate by the default wireless communication standard after decreasing the output level of the second communication apparatus;

an authenticating device configured to authenticate the first communication apparatus to the second communication apparatus after setting the second communication apparatus to the default wireless standard;

an establishing device configured to subsequently establish communication between the second communication apparatus and the first communication apparatus using the default wireless communication standard;

a second transmitting device configured to transmit the new system information from the second communication apparatus to the first communication apparatus after establishing communication between the second communication apparatus and the first communication apparatus using the default wireless communication standard; and wherein communication between the second communication apparatus and the first communication apparatus is established using the new system information.

5. The communication system according to claim 4, wherein the system information includes common network identification information and information related to encryption.

6. The communication system of claim 4, wherein the first predetermined value and the third predetermined values are equal, and wherein the second predetermined value and the fourth predetermined value are equal.

* * * * *